(12) United States Patent
Tuin et al.

(10) Patent No.: US 6,484,386 B2
(45) Date of Patent: Nov. 26, 2002

(54) APPARATUS FOR MAKING BRAKE SHOES

(75) Inventors: Steve Tuin, Grand Haven, MI (US); Thomas Crowell, Muskegon, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/818,026

(22) Filed: Mar. 27, 2001

(65) Prior Publication Data

US 2001/0037921 A1 Nov. 8, 2001

Related U.S. Application Data

(60) Provisional application No. 60/192,983, filed on Mar. 28, 2000.

(51) Int. Cl.$^7$ .............................. B23D 15/18; B23D 7/08
(52) U.S. Cl. ...................... 29/564.8; 29/33 Q; 29/33.5; 29/564.7; 72/166
(58) Field of Search ............................. 29/33 R, 564.8, 29/563, 564.6, 564.7, 33 Q, 417, 33 P, 33 S; 72/129, 325, 324, 327, 167, 166, 133, 172, 179; 188/251 R, 250 B; 228/17

(56) References Cited

U.S. PATENT DOCUMENTS

| | | | | |
|---|---|---|---|---|
| 1,794,348 A | * | 2/1931 | Chase | 188/250 C |
| 3,540,395 A | * | 11/1970 | Skinner | 29/33 R X |
| 4,241,600 A | * | 12/1980 | Pringle | 29/563 X |
| 4,360,959 A | * | 11/1982 | Johannesen | 188/250 C |
| 4,531,276 A | * | 7/1985 | Warwick et al. | 29/417 |
| 4,688,414 A | * | 8/1987 | Mugica | 29/33 R X |
| 5,306,058 A | * | 4/1994 | Sturrus et al. | 138/DIG. 11 |
| 5,440,796 A | * | 8/1995 | Deggau et al. | 188/250 B |
| 5,454,504 A | * | 10/1995 | Sturrus | 228/17 |
| 5,701,655 A | * | 12/1997 | Hales | 188/251 R |

FOREIGN PATENT DOCUMENTS

GB 2211776 * 12/1989 ............... 29/33 R

* cited by examiner

*Primary Examiner*—William Briggs
(74) *Attorney, Agent, or Firm*—Price Heneveld Cooper DeWitt & Litton (57) ABSTRACT

An apparatus adapted to form curved beam sections, such as a brake shoe, includes a rollformer, a cut-off device, and a re-former or sweeping device. The rollformer includes rollers constructed and arranged to rollform the sheet material into an elongated linear beam, where the beam has a T-shaped cross-section. The cut-off device cuts the arcuately-shaped beam into segments that are about 9 to 12 inches long. The sweep device is positioned in line with the rollformer (or off-line as a secondary operation) and is adapted to form the beam into a tightly-radiused longitudinal shape, such as about 100 mm radius, where the support flange and center web form an arcuate crescent shape. In an alternative form, the apparatus also has a re-forming device configured to reshape the segments so that the beam section is very accurately formed. However, it is contemplated that, depending upon the arcuately shaped beam section desired, a re-former may not be required.

17 Claims, 8 Drawing Sheets

APPARATUS FOR MAKING BRAKE SHOES

RELATED APPLICATIONS

The present application claims benefit under 35 USC §119(e) from provisional application Ser. No. 60/192,983, filed Mar. 28, 2000, entitled ROLLFORMED BRAKE SHOE AND RELATED METHOD AND APPARATUS, the entire contents of which are incorporated herein.

BACKGROUND OF THE INVENTION

The present invention relates to crescent-shaped beam-like parts, such as brake shoes, and further relates to apparatus and methods for manufacturing the same.

Existing drum-type brake systems for passenger vehicles include a brake shoe assembly comprising a brake shoe and a brake pad configured to operate with other components for braking and stopping a vehicle. Drum-type brake shoe assemblies are well known in the art, and need not be described herein. These brake shoes typically include a pair of stamped parts welded together to form a center web and a rim that extends about 160 to 170 degrees around the center web to define a semi-cylindrical shape corresponding to a brake pad for supporting the brake pad against an interior cylindrical surface of a brake drum. The center web and the rim form a T-shaped beam-like cross-section that is structurally sufficient to endure the radial and nonradial forces and abuse encountered in use, and further, the center web includes multiple holes, apertures, and notches that facilitate its use with the other vehicle components of the vehicle braking system. Historically, the brake shoes are made by a combination of multiple steps of stamping and welding. However, manufacturing methods and apparatus are desired for manufacturing brake shoes faster, more efficiently, at lower cost, and more consistently. Further, improvements in brake shoes are desired that permit lighter weight brake shoes to be made without resorting to expensive high-strength materials. Also, improvements in brake shoes are desired that can be more easily arcuately bent or swept into a dimensionally-accurate arcuate shape, yet that are sufficiently strong for use as a brake shoe.

Brake shoes made using rollforming technology have been proposed, but such designs to date have been dismissed by persons skilled in the art of rollforming as not commercially feasible. One reason, discussed in more detail below, is because it is very difficult to consistently and reliably bend a T-shaped beam section made from materials having the proposed strength and thickness (e.g. steel sheet having a strength of 60 KSI and a thickness of about 4 mm) into an arcuate shape with sufficient accuracy and repeatability to meet manufacturing specifications for brake shoes. Yet, in order to take maximum advantage of rollforming, the T-shaped beam must first be rollformed, and then the beam must be swept against the "strength" of the beam into a very accurate arcuate shape and then cut to length.

One feature that complicates the manufacture of brake shoes is that they have tight dimensional requirements, and further, the brake shoes have a very small radius, such as about 100 mm radius to an outer surface of the brake shoe. The reasons for the need for tight dimensional requirements are many, but include such things as the need for reliability and consistency of vehicle brakes and the braking operation (including uniform support for all portions of a brake pad), safety, long service life, liability for braking malfunction, and governmental standards. A problem with sweeping or bending of a T-shaped beam is that it causes the beam to "snake" or wander longitudinally as the beam is bent, and further causes the beam flanges to undulate and bend in uncontrolled ways as some beam material is compressed and other beam material is stretched. "Snaking" and non-uniformity is especially problematic on the rim flanges of a brake shoe because the rim flanges must uniformly support a brake pad for good braking performance. Further, the smaller the radius of the bend, the more difficult it is to eliminate snaking and objectionable non-uniformity. Also, good uniformity and "non-undulation" of beam flanges is important to good beam strength, because non-uniformities and undulations can result in premature buckling, bending, and distortion problems. "Snaking" and non-uniformity is also problematic on the center web, since the material of the center web is bent from a linear planar shape to a crescent planar shape while trying to keep the material in the same plane. The problems of snaking and undulations can increase as material thickness and strength are increased.

Another problem occurs when the entire brake shoe is made from a single sheet, instead of being made from separately formed opposing halves that are welded together. The entire brake shoe should preferably be made from a single sheet in order to take maximum advantage of rollforming technology, since this eliminates the need to weld separate pieces together. But in order to make a brake shoe from a single sheet, the center web of the brake shoe must be formed by doubling over adjacent wall sections. When doubled over, the adjacent wall sections are connected by a sharply-bent inner edge. Depending on the material, the sharply-bent inner edge will often split, either at the time it is bent into the doubled back condition or it will split at a later time when in service and during use. In particular, the thick and strong materials needed for manufacturing brake shoes may tend to fracture and break when sharply bent over to form a double thickness wall.

The present invention solves the aforementioned problems and includes aspects having the aforementioned desired advantages.

SUMMARY OF THE INVENTION

One aspect of the present invention is to provide an apparatus adapted to form a plurality of arcuately-shaped beam sections, such as brake shoes, from sheet material. The apparatus includes a rollformer, a cut-off device, and a sweeping device. The rollformer includes rollers constructed and arranged to rollform the sheet material into an elongated T-shaped beam that includes a center web and a support flange along an edge of the center web. The cut-off device cuts the beam into segments having a predetermined length. The sweeping device is constructed to form the segments into an arcuate longitudinal shape where the support flange is accurately re-formed into a cylindrically-shaped rim having a diameter larger than the center web.

In a narrower form, the rim has an outer surface with all portions being within about 1 mm of a true cylindrical surface. In another narrower form, the beam sections define a radius of less than about 500 mm and in a still narrower form, the beam sections define a radius of less than about 80 to 100 mm or less (depending on functional criteria such as uniformity). Also in yet another narrower form, the cut-off device is constructed to cut the beam sections into lengths of about 400 mm or less.

It is an object of the present invention to provide an apparatus that will rollform sheet material into a brake shoe. The apparatus can easily and quickly form a high-strength brake shoe, and is efficient in use, economical to manufacture, capable of a long operable life, and particularly adapted for the proposed use.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
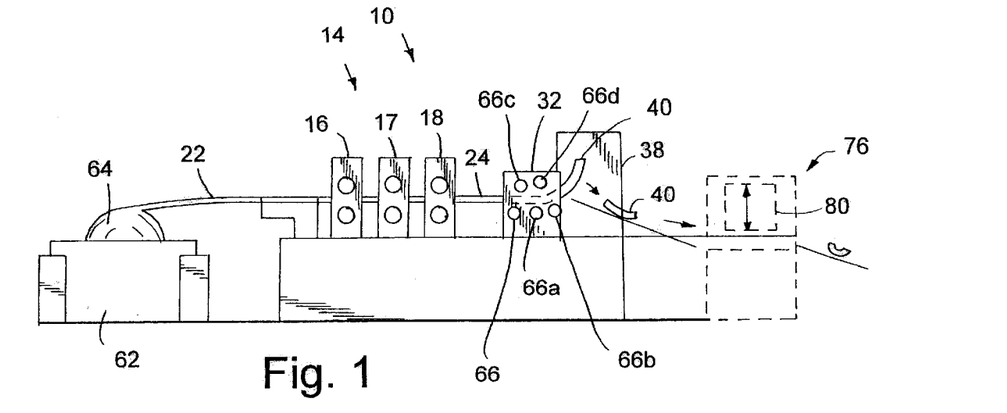
FIG. 1 is a schematic view of an apparatus adapted to form a brake shoe of this invention and for practicing the process of this invention.
Figure 3:
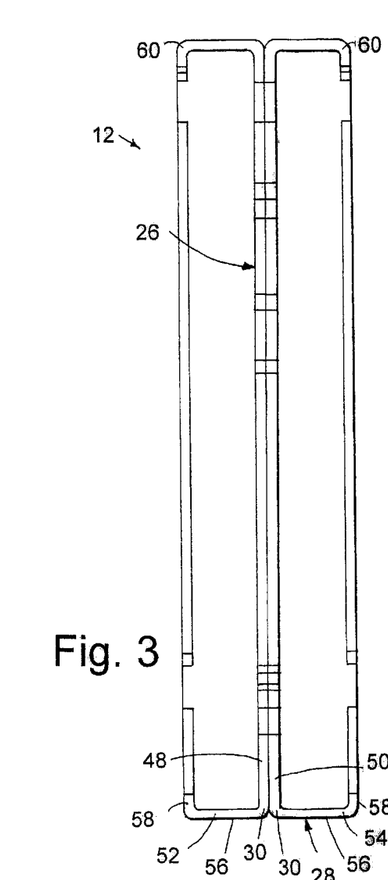
FIG. 3 is a side view of the brake shoe of the present invention.

For purposes of description herein, the terms "upper," "lower," "right," "left," "rear," "front," "vertical," "horizontal," and derivatives thereof shall relate to the invention as orientated in FIG. 1 (front being on the left) and FIG. 3 (front being on the right). However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates an apparatus adapted to form a brake shoe embodying the present invention. In the illustrated example, the apparatus 10 includes a rollformer 14, a sweep station 32 and a cut-off device 38. The rollformer 14 includes roller stations 16–18 (more stations could be used if needed) constructed and arranged to rollform sheet material 22 into an elongated T-shaped beam 24. The beam (FIG. 8) has a T-shaped cross-section that includes a double-thick center web 26 and opposing support flanges 28 along each edge 30 of the web 26. An outer flange 58 is formed along an outer edge of flanges 28 to stabilize the flanges 28. The outer flange 58 gives surprising and unexpected results in how it stabilizes the outer flange 58, both in terms of stabilization when forming the brake shoe 12 to reduce unwanted undulations and unwanted distortions, and also in terms of structure when using the brake shoe 12 in service. Flange 58 provides this strength and stability despite only being about 6.0 to 7.0 mm high. Notably, the brake shoe 12 has a transverse width of about 44 to 45 mm (i.e. across flanges 28) and web 26 has a highest dimension of about 35 to 40 mm.

The sweeping device forms a sweep station 32 (FIG. 1) in apparatus 10. The sweep station 32 is positioned in line with the rollformer 14 and is adapted to form the beam 24 into an arcuate longitudinal shape where the support flange 28 is re-formed into a cylindrically-shaped rim 36 having a diameter larger than the center web 26. The cut-off device 38 cuts the beam 24 in the curvilinear longitudinal shape into segments 40 (FIG. 2) that form portions of a circle. Depending on the material and a shape of the final product being formed, it is contemplated that the sweep station 32 can form an arcuate segment 40 that defines about 90° of a circle, or preferably, in the present case of brake shoes 12, about 160° to 170° of a circle. A reforming device 76 such as a stamping press includes dies configured to re-form the segment 40 to a final shape where the final shape cannot be formed in the sweep station 32. Blank or segment 40, for example, is initially formed into an arcuate section having a diameter of about 500 mm to 1000 mm and a length of about 300 mm (i.e. 10 to 12 inches). Re-forming device 76 then reshapes the segment 40 coming off the sweep stations 32 into a final shape, as discussed below.

Figure 4:
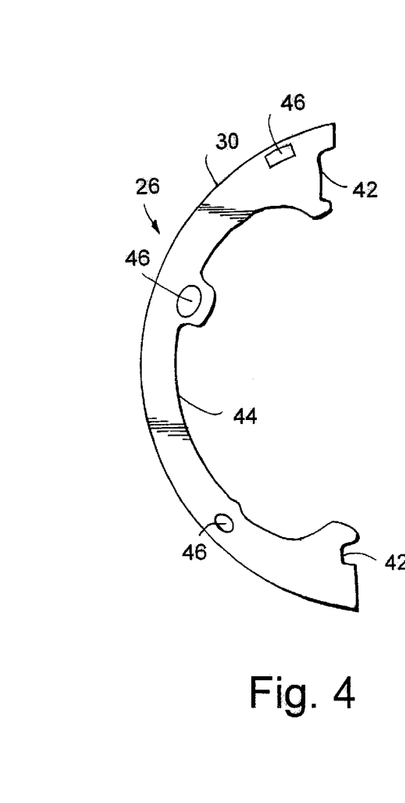
FIG. 4 is a side view of a center web of the brake shoe of the present invention.

In the illustrated example, the brake shoe 12 (FIGS. 2–4) includes the center web 26 and the support flange 28. The illustrated center web 26 has end notches 42, a center notch 44 and holes 46. The end notches 42, the center notch 44 and the holes 46 help to support the brake shoe 12 within a vehicle. As seen in FIG. 3, the center web 26 includes a first center web portion 48 and a second center web portion 50 forming a double wall thickness, which can be spot-welded or line-welded together for added strength, if desired. The center notch 44 is pierced into the inside periphery of the center web 26 in the re-forming device 76 with dies 80. It is contemplated that the sheet 22 can be pre-pierced ahead of rollforming, or pierced after the cut-off station.

Figure 2:
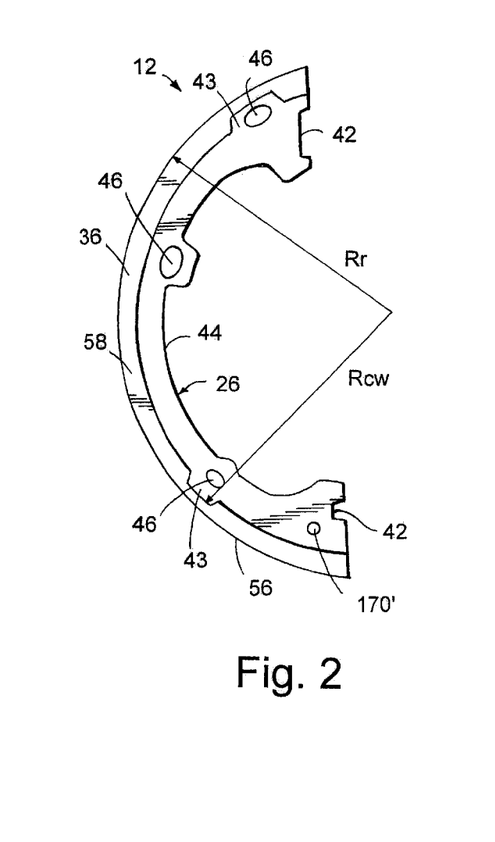
FIG. 2 is a front view of the brake shoe of the present invention.

The illustrated brake shoe 12 also includes support flange 28 along the edge 30 of the center web 26. In the illustrated example, the support flanges 28 each include a first flange section 52 and a stabilizing second flange section 54 at the edge 30 of the first center web portion 48 and the second center web portion 50, respectively. As seen in FIGS. 2 and 3, the first flange section 52 and the second flange section 54 form a pair of arcuately-shaped flange sections, each having an outer surface 56 that lies on a common cylindrical geometric shape with a constant diameter $R_r$. The illustrated brake shoe 12 also includes stiffening flanges 58 on the rim 36 that stiffens an outward edge 60 of the rim 36. As seen in FIG. 3, each of the first flange section 52 and the second flange section 54 include a stiffening flange 58. The stiffening flanges 58 have flange notches 43 in order to allow access to the holes 46 in the center web 26.

Where the sweep station 32 can only form the rim 36 to a radius $R_r$ of about 1000 mm down to about 500 mm (or less, depending on the material of segment 40) as it exits the sweeping station 38, a re-forming station 76 is used (see FIG. 1) to form brake shoes 12. The segment 40 is re-formed to have a radius $R_r$ of about 100 mm or less in re-forming device 76. Furthermore, the brake shoe 12 preferably extends about 150° to 180°, and most preferably extends about 160° to 170° of a circle after re-formed, such that it can be used in pairs for drum brakes in passenger vehicles. Notably, as seen in FIG. 2, the radius $R_r$ of the rim is larger than a radius $R_{cw}$ of the center web 26, so that the large "flat" outer surface 56 can be used inside a brake drum to support brake shoes.

Figure 1A:
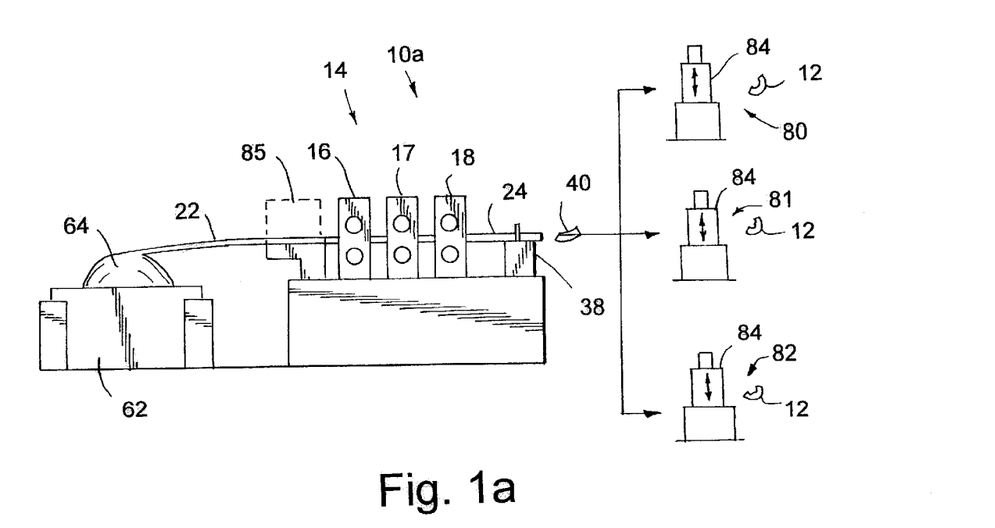
FIG. 1a is a schematic view of a second apparatus adapted to form a brake shoe of this invention and for practicing the process of this invention.
Figure 5:
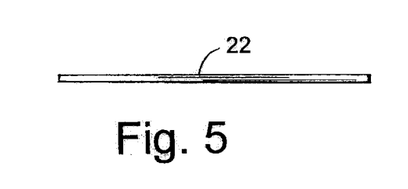
FIG. 5 is a side view of sheet material used to form the brake shoe before the sheet material has passed through a first roller of the apparatus of the present invention.
Figure 6:
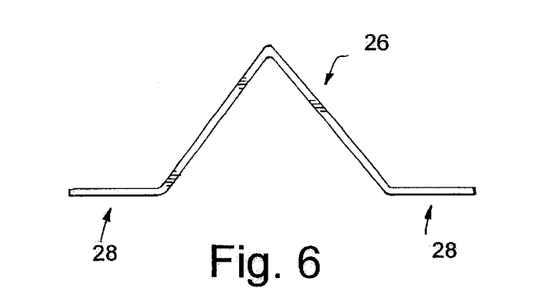
FIG. 6 is a side view of the sheet material used to form the brake shoe after the sheet material has passed through the first roller of the present invention.
Figure 7:
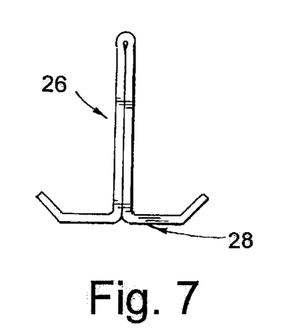
FIG. 7 is a side view of the sheet material used to form the brake shoe after the sheet material has passed through a second roller of the present invention.
Figure 8:
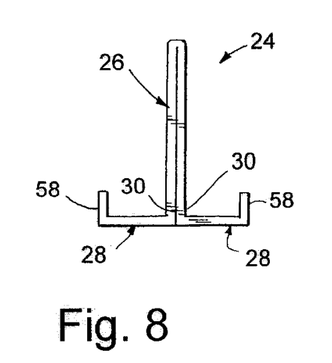
FIG. 8 is a side view of the sheet material used to form the brake shoe after the brake shoe has passed through a third roller of the present invention.

FIG. 1a discloses a modified apparatus 10a for forming the brake shoe 12 of this invention and thus illustrates an alternative process in producing the brake shoe 12. In FIG. 1a, reference numeral 10 designates the overall apparatus which, starting from the left side of the figure, discloses a steel roll holder 62 which rotatably supports a steel roll 64 which contains sheet material 22 as disclosed above, and which extends into the series of roller stations illustrated by three roller stations 16–18. The rollers in stations 16–18 have a shape such that as the sheet material 22 is passed therethrough, it is gradually formed into the form as disclosed in FIGS. 5–8. FIG. 5 is a side view of sheet material 22 used to form the brake shoe 12 before the sheet material 22 has passed through the first roller station 16 of the apparatus 10. FIG. 6 is a side view of the sheet material 22 used to form the brake shoe 12 after the sheet material 22 has passed through the first roller station 16. FIG. 7 is a side view of the sheet material 22 used to form the brake shoe 12 after the sheet material 22 has passed through the second roller station 17. FIG. 8 is a side view of the sheet material 22 used to form the brake shoe 12 after the brake shoe 12 has passed through the third roller station 18. Although I have disclosed three such roller stations for illustration purposes, the number can be substantially increased, and for some shapes and materials may actually be decreased.

A sweeping means is provided downstream of the third roller 18 for producing the sweep of the brake shoe 12 (FIGS. 2–4) (often called "sweeping the beam"). (The sweeping means can be located in-line with and immediately after the roller 18 (as shown in FIG. 1), or it can be located after the cutting device 38 (see FIG. 12), or is can be located off-line in a remote location (i.e. as a separate secondary operation away from the rollformer.) The illustrated sweep producing or sweeping means (FIG. 1) comprises the sweep station 32 which, as illustrated, includes a series of outer mandrels or rollers 66, 66a, 66b, 66c and 66d through which the beam 24 passes. Each mandrel is adjustably held by a mandrel frame, which is anchored by a stabilizer to the frame of the sweep station 32. The sweep of the tube may be increased by vertical adjustment of the rollers 66–66d. Therefore, as the rollformed beam 24 passes over and between the rollers 66–66d, the beam 24 assumes the curvature or sweep of the mandrels. It is contemplated that a sweep station with mandrels as taught in Sturrus U.S. Pat. Nos. 5,454,504 and 5,306,058, issued Aug. 29, 1994, and Mar. 26, 1990, respectively, can also be used to form a sweep. Accordingly, the entire contents of these two patents are incorporated herein in their entirety for the purpose of providing a complete disclosure.

It should be understood that as the steel strip continues to pass through the rollers 16, 17, and 18 downstream of the sweep station 32, it is progressively formed by the rollers 16, 17, and 18 to the shape as disclosed in FIGS. 5–8. This allows the rollers 16–18 to generate sufficient force to force beam 24 forward across the sweep station 32 without crushing or deforming the cross-section of beam 24. As disclosed in FIG. 1, the cut-off device 38 is located downstream of the mandrels for cutting off the beam 24 at its proper length. It is contemplated that the cut-off device 38 includes conventional cut-off devices such as a band saw, stamping dies, or shear dies. It may also comprise break-off devices where the beam is sharply notched or scored in a transverse direction and then bent over a fulcrum to break apart until individual segments 40 break apart as the beam 24 is moved past the cut-off device 38.

As an alternative to the sweep station 32, the apparatus 10 can include only the rollformer 14 and the cut-off device 38 (i.e. no sweep station) along with a re-forming device 76 (FIG. 1a). The re-forming device 76 is configured to reshape the cut segments 40 after the beam 24 has passed through the rollformer 14 so that the support flanges 28 and 58 are cylindrically-shaped and define an arcuate section of a circle that is about 10 to 12 inches long. Preferably, the re-forming device 76 is configured to re-form the segments 40 into shapes that form about 150° to 180°, and most preferably, 160° to 170° of a circle. It is contemplated that the re-forming device can include different arrangements. For example, FIG. 1a illustrates three stations 80–82 that are arranged in a parallel relationship to each other. This is based on the fact that historically, rollforming devices can produce parts of this length at about three times the speed of a stamping die. The three stations 80–82 of the re-forming device 76 are arranged and have part-handlers capable of sequentially taking the segments 40 as the segments 40 come off the rollformer 14. Each station 80–82 of the re-forming device 76 in FIG. 1a includes a reciprocating die 84 configured to reshape the brake shoe device 12 so that the support flanges 28 and 58 are reshaped from a straight line to a cylindrical shape. Preferably, the three stations 80–82 each are configured to shape the brake shoe device 12 into an arcuate cross-section having a very accurate and precisely-formed outer surface. Each station 80–82 progressively re-forms the segments 40 from their configuration after traveling through the cutting device 38 and the final configuration of the brake shoe 12 as seen in FIG. 2. The three stations 80–82 potentially individually cannot operate fast enough to accept the segments 40 coming off the rollformer 14, but combined together can take the segments 40 from the rollformer 14 at a rate that approximately corresponds to the speed of the rollformer 14.

The apparatus 10 could also include a pre-piercing device 85 (FIG. 1a). The pre-piercing device pierces some or all of the holes and notches in the sheet 22 prior to passing the beam 24 through the sweep station 32. The holes and notches formed by the pre-piercing device become the end notches 42, rim notches 43, center notch 44, and holes 46 in the brake shoe 12.

Figure 10:
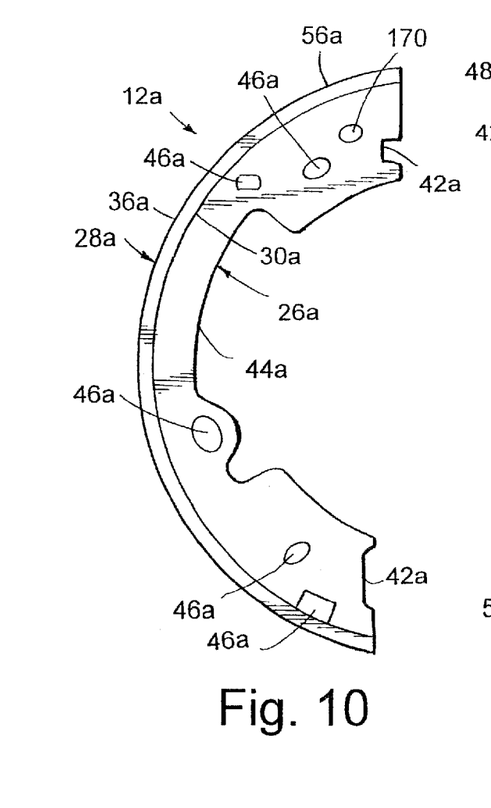
FIG. 10 is a front view of the brake shoe of a second embodiment of the present invention.
Figure 11:
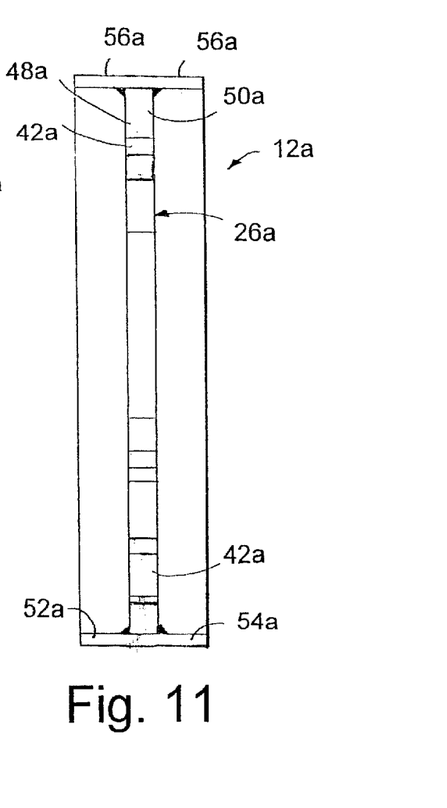
FIG. 11 is a side view of the brake shoe of the second embodiment of the present invention.
Figure 13:
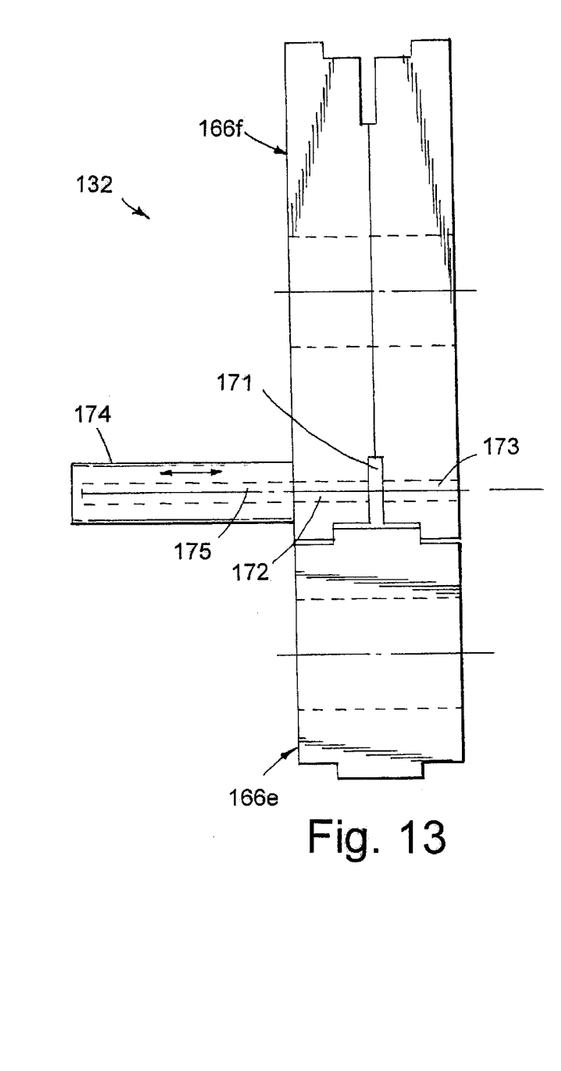
FIG. 13 is a front view of the rollers in the sweep station of FIG. 12.

The reference number 12a (FIGS. 10–11) generally designates a second brake shoe manufactured by the apparatus 110 described below. The brake shoe 12a (FIGS. 10–11) is similar to the previously described brake shoe 12 (FIGS. 2–3). Accordingly, similar components and features appearing in FIGS. 2–3 and 10–11, respectively, are represented by the same corresponding reference number, except for addition of the suffix "a" in the numerals of the latter. The illustrated brake shoe 12a is substantially identical to the brake shoe 12 of the first embodiment except that the first flange section 52a and second flange section 54a of the brake shoe 12a do not include a stiffening flange 58. Also, the center web 42a is a separate piece welded to the one-piece rim 36a. Further, a hole 170 is added at a leading end of the center web 42a for the purpose of receiving a retainer pin 175 (see FIGS. 13–14) for holding the leading end of the linear T-shaped beam section 124 (see FIG. 14) in a cavity on the sweep roller 172 as the beam section 124 is wrapped around the sweep roller 172, as described below.

Although the illustrated brake shoe 12 is formed from a sheet of high-strength steel, the specific grade and type of high-strength steel may vary within a range of parameters depending upon the specific application in question. This range includes at least two specific parameters which, in accordance with narrow aspects of this invention, are important to the invention; specifically, the tensile strength generally measured in units of KSI (thousand pounds of force per square inch) and thickness generally measured in the thousandths of an inch or in millimeters (mm). The brake shoe 12 is preferably made from sheet material 22 having a tensile strength of about 25 to 35 KSI and thickness of 0.093 inches and a very good elongation property. The brake shoe 12a has a rim 36a preferably made from sheet material having a tensile strength of about 60 KSI or less and thickness of about 0.160 inches (i.e. about 4.2 mm) and a very good elongation property, and has a web 42a preferably made from sheet material having a tensile strength of about 60 KSI or less and thickness of about 0.320 inches and height of about 1.375 inches. The rim 36a is welded to the web 42a by continuous or intermittent weld lines on each side of the web 42a.

OPERATION

Figure 9:
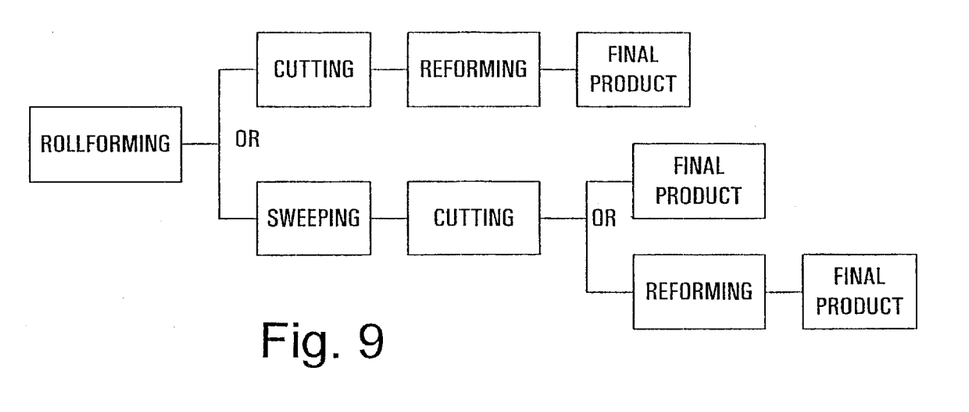
FIG. 9 is a block diagram of the process of the present invention.

Having described the apparatus 10 and the brake shoe 12 that is formed thereby, the operation of apparatus 10 and the uniqueness of the brake shoe 12 is evident. As seen in FIG. 9, the final product of the brake shoe 12 (as seen in FIG. 2) can be formed in several different ways. In a first method, the brake shoe 12 is made by rollforming and/or welding a T-shaped elongated linear beam 24, cutting the beam 24 into (straight) segments 40, and re-forming the segments 40 via one or more lines of re-forming devices 76 (see FIG. 1a) or by sweeping devices (see FIGS. 13–14) so that the flanges 26 and 28 are cylindrically-shaped and the re-formed segments 40 define the final product of the brake shoe 12. In a second method, the brake shoe 12 can be made by rollforming the sheet material 22 into the elongated T-shaped beam 24, cutting and/or sweeping the beam 24 to form the beam 24 into an arcuate longitudinal shape where the support flange 28 is formed into a cylindrically-shaped rim 36 and center web 26. It is contemplated that the T-shaped beam can be made from a single sheet (see FIG. 8) or from a pair of L-shaped members (see FIG. 20) or by a weldment of perpendicular members (see FIG. 11 and also FIG. 15). A third method is used where there are advantages to rollforming the beam shape, but where the radius of the segments 40 cannot be made small enough on or inline with the rollformer apparatus. In the third method, the brake shoe 12 is made by re-forming the segments 40 that are partially swept into final curvilinear shapes. This can be done in-line or off-line by a stamping device 76 (see FIG. 1, dashed lines) or by a sweeping roller (see FIGS. 13–14). The method of making the brake shoe 12 in any of the methods described directly above can also include pre-piercing holes and notches into the sheet 22 before sweeping the beam 24 (see FIG. 1a, item 85), or piercing/stamping after sweeping. It is also contemplated that the T-shaped segments can be made by means other than rollforming, such as by stamping or the like, and thereafter the segments can be swept by sweeping rollers (see FIGS. 13–14).

MODIFICATION

Apparatus 110 (FIG. 12) illustrates another embodiment of the present invention. Development and testing has shown that the apparatus 110 (FIG. 12) is able to form substantially complete brake shoes 140 that extend about 170° around a true cylindrical shape with outer surfaces that are very close to final tolerances. (The brake shoes 140 may need to have the stem web stamped after the sweeping step, such as by the device 176, as discussed below, depending on the pre-piercing process.) The apparatus 110 includes the components 14, 16–18, 22, 24, 38, 62, 64, and 85, previously described. It also optionally includes an in-line stamping device 176 with reciprocating ram and dies 180 that are shaped to re-strike the brake shoes 140 to assure the exact dimensions of the brake shoes 140. The re-forming device 176 can also be configured to stamp out the final shape of the web 26 (for example, see FIGS. 2–4). It is contemplated that automatic material handling equipment can be used to feed shoes 140 from the sweep station 132 to the stamping device 176 in line with the rollformer, or the shoes 140 can be finish-stamped in a separate location. Where the T-shaped beam 24 is formed by opposing L-shaped beams welded together (see FIG. 15) or by a center web 42a and separate rim 56a welded together (see FIG. 15), a weld station 138 is provided ahead of the cut-off device 38.

Figure 14:
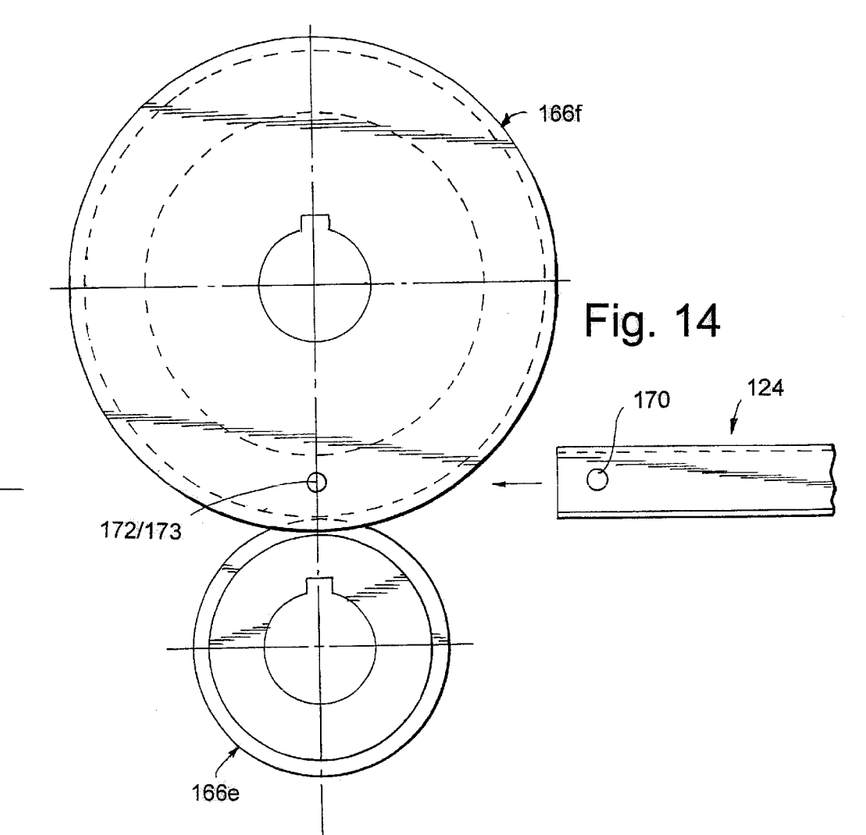
FIG. 14 is a side view of the rollers in FIG. 13.
Figure 15:
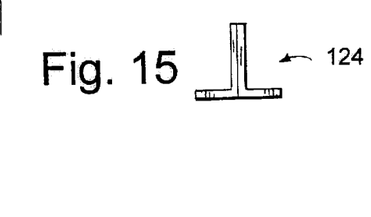
FIG. 15 is a cross-sectional view of the rollformed T-shaped stock being fed into the sweep station of FIG. 14.
Figure 16:
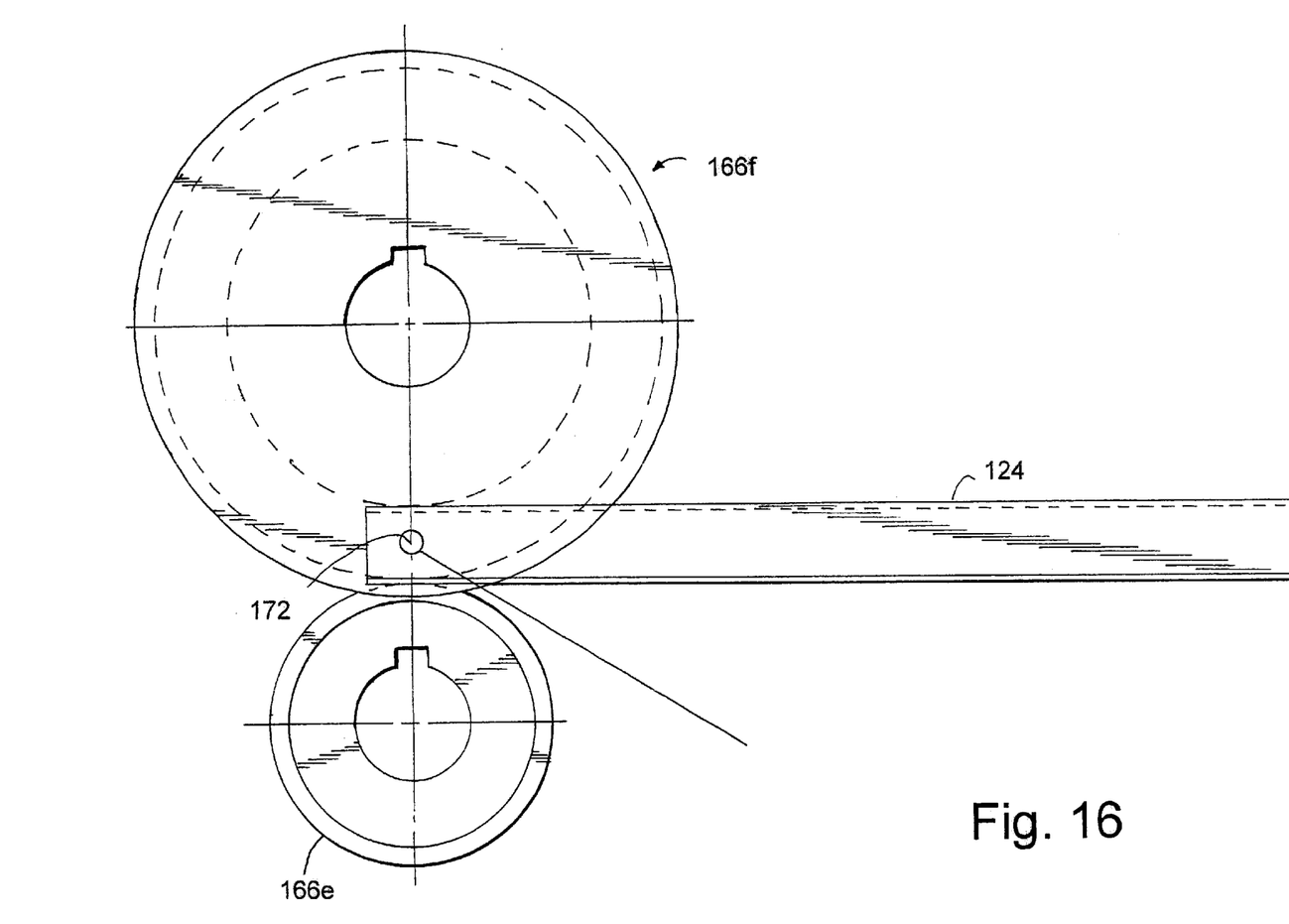
FIG. 16 is a side view similar to FIG. 14, but at the point in time where the T-shaped stock being fed into the rollers has a nose hole aligned with a capture pin on the rollers.

A focus of the apparatus 110 is in sweeping device 132. It is contemplated that the sweeping device 132 may be positioned in-line with the rollformer 110 (see FIG. 12) or the sweeping device 132 can be positioned off-line in a place where reforming the T-shaped segment is a secondary operation performed separate from the rollforming operation. The rollformed T-shaped stock (FIG. 15) is initially formed as a linear beam 124 by the rollers 1618. As noted above, the T-shaped stock can be rollformed from a single sheet of material (see FIGS. 8 and 11) or it can be a welded assembly of two L-shaped beams (see FIG. 15 and FIG. 20) that are rollformed adjacently and then welded by weld station 138 or it can be formed by a center web 42a and a rim 56a welded together (see FIGS. 11 and 15). The pre-pierce device 85 (FIG. 12) periodically pierces holes in the sheet material 22, which results in a retaining hole 170 at the leading end of the linear beam 124 (FIG. 14). Rollers 166e and 166f are provided in the sweeping device 132. The rollers 166e and 166f (FIG. 13) mate together to define a cavity 171 shaped to closely receive the T-shaped linear beam 124. As the leading end of the linear beam 124 enters the cavity 171 (FIG. 16), the hole 170 aligns with holes 172 and 173 (FIGS. 13–14) in the top roller 166f. A nose retainer (FIG. 13) is attached to the roller 166f (or is configured to move with the roller 166f) and includes a pin-extending device 174 on a side of the roller 166f, and an extendable retainer pin 175. The pin-extending device 174 is configured to extend the retainer pin 175, such as about a half-inch to an inch, telescopingly into the holes 170 and 172–173 when the holes become aligned. The extended retaining pin 175 grips the leading end of the linear beam through hole 170 and holds it fly within the cavity 124 despite high stresses on the beam 124 and rollers 166e and 166f. It is contemplated that the pin-extending device 174 can be triggered to extend the pin 175 in different ways, such as by a photo-sensor that senses the location of hole 170 and/or the alignment of holes 170, 172–173, or simply by mechanically timing its actuation with the pre-pierce device 85 and movement of the strip 22. Notably, the pin-extending device 174 can be positioned adjacent the roller 166f and configured to move along a path parallel the holes 172–173 as the roller 166f is rotated, instead of the device 174 being attached to the roller 166f. The pin 175 can have a tapered nose, if desired, for improved extension into the hole 170 despite minor misalignment of the holes. The actual distance that the pin 175 is extended can vary, but it is believed that a short distance of about ½" to 1" is sufficient, with the pin 175 being supported at both ends when extended.

Figure 17:
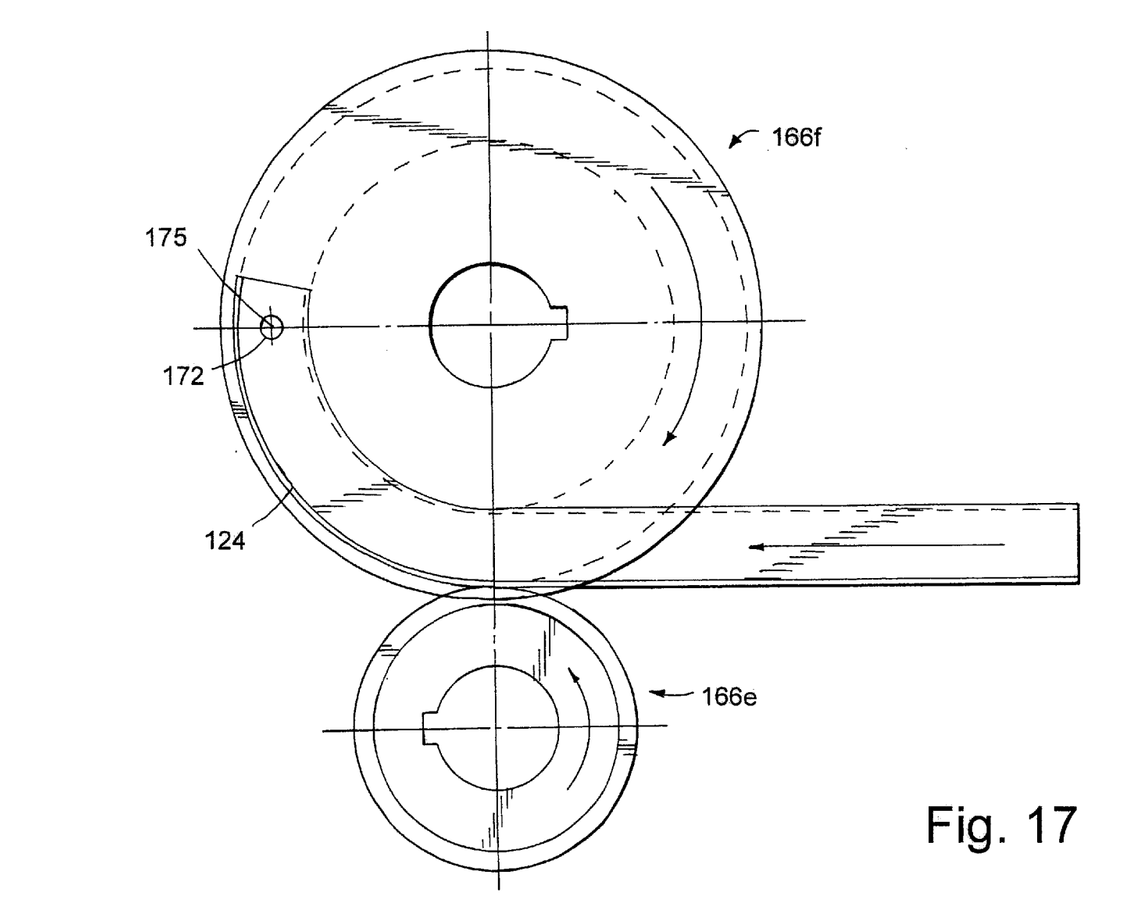
FIG. 17 is a side view similar to FIG. 16, but with the T-shaped stock drawn a quarter of the way around the rollers.

Extension of the pin 175 through hole 170 captures and securely retains the nose end of the linear beam 124 in the cavity 171 as the rollers 166e and 166f are rotated. As the linear beam 124 is drawn around the roller 166f (compare FIGS. 16 and 17), snaking and other non-uniform bending is closely controlled and virtually eliminated by the capturing shape of the cavity 171. Additional rollers shaped like roller 166e or other supports can be positioned around roller 166f, but testing to date indicates that this is not needed. Where desired, the roller 166f can be split by a plane that extends perpendicular to its axis of rotation, the plane splitting the roller into opposing halves along a parting line 176, with the halves being biased toward each other or held together against the sides of the base of the T-shaped beam 124. By cutting the linear beam 124 into discrete lengths, such as about 400 mm, or whatever length is required by the final brake shoe 140, the arcuately-shaped product coming off the roller 166f is substantially completely and finally formed. (The discrete length can be left slightly "too long" to facilitate end-trimming in dies in the stamping device 176.) Once the brake shoe 140 is fully formed on the roller 166f, the pin 175 is retracted such that the brake shoe 140 falls off the roller 166f and away down a discharge chute. If necessary, an ejector blade can project into the cavity 171 from above at a location where it will force the fully formed brake shoe 140 off the roller 166f such that it drops off of the roller 166f. It is contemplated that the roller 166f can be operated at a speed sufficient to allow the rollforming process to be continuous and nonstop. The rotation of rollers 166e and 166f can also be continuous. Alternatively, it can hesitate after each rotation to facilitate aligning the hole 170 with the holes 172–173.

Figure 18:
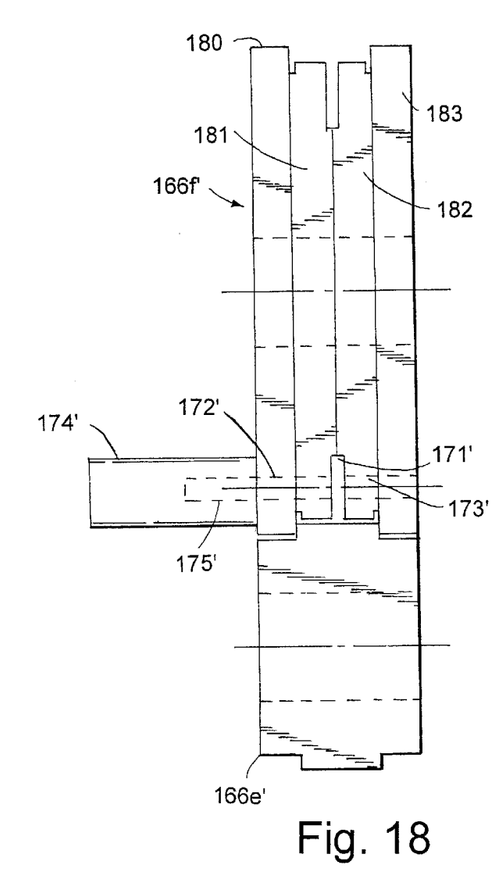
FIGS. 18–19 are views of another modified apparatus, the views being similar to FIGS. 13–14, but the rollers being adapted to receive T-shaped stock having an outer flange as shown on the brake shoe shown in FIGS. 8 and 20.
Figure 19:
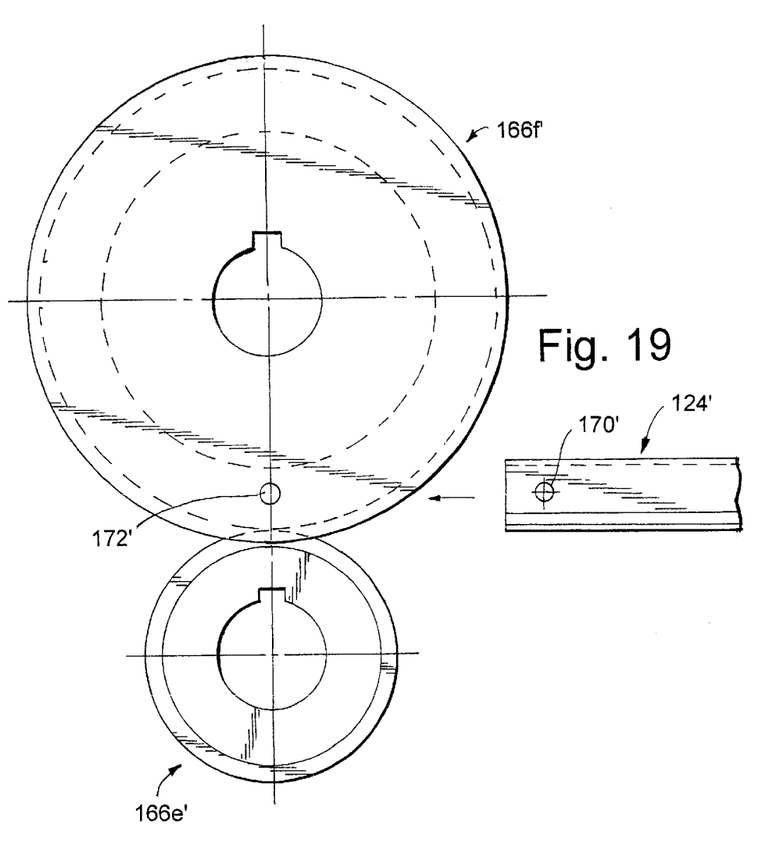
Figure 20:
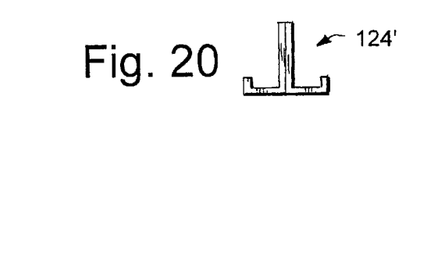
FIG. 20 is a cross-sectional view of a rollformed T-shaped beam, where the section includes two oppositely-facing L-shaped rollformed beams welded together to form the T-shaped beam.

FIGS. 18–19 show another apparatus 110A that is similar to the apparatus 110, but that is adapted to sweep a T-shaped beam 124' having edge flanges like those shown in FIG. 8 (flanges 58) and FIG. 20 (flanges 158). Specifically, the rollers 166e' and 166f' are modified to receive the T-shaped beam 124'. The beam 124' includes a hole 170' in its leading end, and a pin 175' is extendable by device 174' through holes 172' and 173' (and hole 170') when aligned with hole 170'. If needed, the roller 166f' is provided with four disk-shaped sections 180–183 sandwiched together to define a cavity 171' for receiving the T-shaped beam 124'. The outer sections 180 and 183 may be movable away from the inner sections 181 and 182 in order to assure release of the brake shoe 140 after the sweeping operation. Notably, control over snaking of the outer flanges 58 (or 158) is less critical than an outer flange 28. An ejector blade can also be extended into the cavity 171 to force the completed brake shoe 140 out of the cavity 171.

Figure 12:
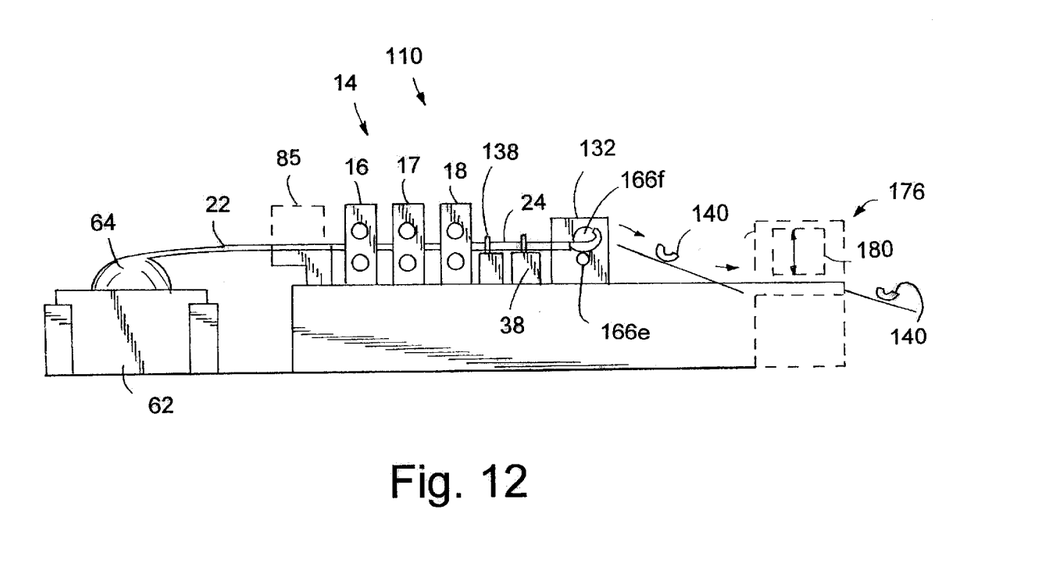
FIG. 12 is a schematic view of another apparatus adapted to form a brake shoe of this invention.

As noted above, it is specifically contemplated that the sweeping roller arrangement shown in FIGS. 13–14 and 16–17 has utility separate from the rollforming apparatus noted in FIGS. 1, 1a, and 12. Accordingly, claims to this sweeping roller arrangement are not intended to be limited to rollforming unless they specifically recite the same.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus adapted to form a plurality of arcuately-shaped beam sections, such as brake shoes from sheet material, the apparatus comprising:
   a rollformer including rollers constructed and arranged to rollform the sheet material into an elongated T-shaped beam that includes a center web and a support flange along an edge of the center web;
   a cut-off device constructed to cut the beam into segments having a predetermined length; and
   a sweep device constructed to form one of the segments and the beam into an arcuate longitudinal shape where the support flange is accurately re-formed into a cylindrically-shaped rim having a diameter larger than the center web, wherein the sweep device includes a sweep roller and a nose retainer coupled to the sweep roller, the nose retainer being configured to engage and grip a leading end of the segments and hold the leading end tight against the sweep roller as the sweep roller is rotated.

2. An apparatus adapted to form a plurality of arcuately-shaped beam sections, such as brake shoes from sheet material, the apparatus comprising:
   a rollformer including rollers constructed and arranged to rollform the sheet material into an elongated T-shaped beam that includes a center web and a support flange along an edge of the center web;
   a cut-off device constructed to cut the beam into segments having a predetermined length; and
   a sweep device constructed to form one of the segments and the beam into an arcuate longitudinal shape where the support flange is accurately re-formed into a cylindrically-shaped rim having a diameter larger than the center web, wherein the sweep device includes a sweep roller and a nose retainer associated with the sweep roller, the nose retainer being adapted to grip a leading end of the segments and hold the leading end tight against the sweep roller as the sweep roller is rotated, the nose retainer including a laterally extendable shiftable pin adapted to securely but releasably engage a hole in a leading end of the segments.

3. The apparatus defined in claim 2, wherein the sweep device is configured to form the beam into a radius of less than about 500 mm.

4. The apparatus defined in claim 3, wherein the cut-off device is constructed to cut the beam sections into lengths of about 100 mm or less.

5. The apparatus defined in claim 2, including a re-forming device in-line with the rollformer that is configured to reshape the segments so that the flange is cylindrically-shaped and defines an arc extending more than about 90° of a circle.

6. The apparatus defined in claim 5, wherein the re-forming device is configured to reshape the segments to define an arc of about 160° to 170°.

7. The apparatus defined in claim 6, wherein:
the re-forming device is configured to form the segments into shapes where the rim has a radius of about 100 mm or less.

8. An apparatus adapted to form a plurality of arcuately-shaped beam sections, such as brake shoes from sheet material, the apparatus comprising:
a rollformer including rollers constructed and arranged to rollform the sheet material into an elongated T-shaped beam that includes a center web and a support flange along an edge of the center web;
a cut-off device constructed to cut the beam into segments having a predetermined length;
a sweep device constructed to form one of the segments and the beam into an arcuate longitudinal shape where the support flange is accurately re-formed into a cylindrically-shaped rim having a diameter larger than the center web;
a re-forming device in-line with the rollformer that is configured to reshape the segments so that the flange is cylindrically-shaped and defines an arc of about 160° to 170°; the re-forming device being configured to form the segments into shapes where the rim has a radius of about 100 mm or less;
wherein the re-forming device includes at least three stations that are arranged in a parallel relationship to each other to sequentially take the segments as the segments come off the sweep station;
the at least three stations including reciprocating dies that individually cannot operate fast enough to accept the segments coming off the rollformer, but that together combined can take the segments from the rollformer at a rate that corresponds to a line speed of the rollformer.

9. The apparatus defined in claim 2, wherein:
the rollers are configured to make a stiffening flange on the rim that stiffens an outward edge of the rim.

10. An apparatus adapted to form a plurality of arcuately-shaped beam sections, such as brake shoes from sheet material, the apparatus comprising:
a rollformer including rollers constructed and arranged to rollform the sheet material into an elongated T-shaped beam that includes a center web and a support flange along an edge of the center web;
a cut-off device constructed to cut the beam into segments having a predetermined length; and
a sweep device constructed to form one of the segments and the beam into an arcuate longitudinal shape where the support flange is accurately re-formed into a cylindrically-shaped rim having a diameter larger than the center web;
wherein the rollers are configured to make a stiffening flange on the rim that stiffens an outward edge of the rim;
wherein the rollers are configured and arranged to form the center flange from a double wall thickness of a center portion of the sheet, and further are configured and arranged to form the rim from opposing edge portions of the sheet;
the opposing edge portions each being formed into a pair of arcuately-shaped flange sections each having an outer surface that lies on a common cylindrical geometric shape with a constant diameter.

11. The apparatus defined in claim 2, further comprising:
a pre-piercing device for piercing holes and notches in the sheet prior to cutting the beam.

12. The apparatus defined in claim 2, wherein:
the rollers are configured and arranged to form material where material wall thickness of the sheet is about 4 mm or less.

13. The apparatus defined in claim 12, wherein:
the rollers are configured and arranged to form material where material wall thickness of the sheet is about 3 mm or less.

14. The apparatus defined in claim 2, wherein:
the rim has an outer surface with all portions that are within about 1 mm of a true cylindrical surface.

15. The apparatus defined in claim 2, wherein:
the rollers are configured and arranged to form material where material tensile strength is at least about 45 KSI.

16. The apparatus defined in claim 2, wherein the rollformer includes forming rolls adapted to form two opposing L-shaped beams that abut to define the T-shaped beam, and further includes a welder for welding the L-shaped beams together permanently into the configuration of T-shaped beams.

17. The apparatus defined in claim 2, wherein the rollformer includes forming rolls adapted to form and hold two sheets together in a perpendicular arrangement, and further includes a welder for welding the two sheets together permanently into the configuration of the T-shaped beam.

* * * * *